United States Patent
Lange et al.

(10) Patent No.: US 8,865,858 B2
(45) Date of Patent: Oct. 21, 2014

(54) PROCESS FOR PRODUCING A COMPOSITE MATERIAL

(71) Applicant: BAS SE, Ludwigshafen (DE)

(72) Inventors: Arno Lange, Bad Dürkheim (DE);
Gerhard Cox, Bad Dürkheim (DE);
Hannes Wolf, Ludwigshafen (DE);
Szilard Csihony, Gorxheimertal (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/926,364

(22) Filed: Jun. 25, 2013

(65) Prior Publication Data

US 2013/0345385 A1    Dec. 26, 2013

Related U.S. Application Data

(60) Provisional application No. 61/664,192, filed on Jun. 26, 2012.

(51) Int. Cl.
*C08G 16/02* (2006.01)
*C08G 77/12* (2006.01)
*C08G 77/06* (2006.01)

(52) U.S. Cl.
CPC .................................. *C08G 77/06* (2013.01)
USPC ............... 528/230; 528/8; 528/31; 528/394; 528/395

(58) Field of Classification Search
None
See application file for complete search history.

(56) References Cited

U.S. PATENT DOCUMENTS

| | | | |
|---|---|---|---|
| 2,755,269 A * | 7/1956 | Moorhead | 528/29 |
| 3,631,151 A * | 12/1971 | Huster | 528/154 |
| 2010/0284882 A1 | 11/2010 | Koch et al. | |
| 2012/0052300 A1 | 3/2012 | Nozari et al. | |
| 2012/0091400 A1 | 4/2012 | Konig et al. | |
| 2012/0184702 A1 | 7/2012 | Lange et al. | |
| 2012/0251889 A1 | 10/2012 | Janssen et al. | |
| 2013/0043427 A1 | 2/2013 | Cox et al. | |
| 2013/0069021 A1 | 3/2013 | Lange et al. | |
| 2013/0189550 A1 | 7/2013 | Janssen et al. | |
| 2013/0341559 A1 | 12/2013 | Lange et al. | |

FOREIGN PATENT DOCUMENTS

| | | |
|---|---|---|
| DE | 1816241 A1 | 7/1969 |
| FR | 2626575 A1 | 8/1989 |
| GB | 1225148 A | 3/1971 |
| WO | WO-2009/083083 A1 | 7/2009 |
| WO | WO-2009/133086 A2 | 11/2009 |
| WO | WO-2010/112581 A1 | 10/2010 |
| WO | WO-2010/128144 A1 | 11/2010 |
| WO | WO-2012098149 A2 | 7/2012 |
| WO | WO-2012131628 A1 | 10/2012 |
| WO | WO-2013027157 A2 | 2/2013 |
| WO | WO-2013042034 A1 | 3/2013 |
| WO | WO-2013110985 | 8/2013 |
| WO | WO-2014001949 | 1/2014 |

OTHER PUBLICATIONS

Chiba, T., et al., "Electrocatalytic Reduction Using Raney Nickel", 56 *Bull. Chem. Soc. Jap.* 719-23 (1983).
Grund, S., et al., "Nancomposites Prepared by Twin Polymerization of a Single-Source Monomer", 46 *Angew. Chem., Int. Ed.* 628-32 (2007).
Kiong, L., et al., "Long-chain Phenols. Part 18. Conversion of Anacardic Acid into Urushiol", *J. Chem. Soc. Perkin Trans. I,* 1942-52 (1981).
Strating, J., et al., "Some Aromatic Diols and Phenols", 62 *Rec. Tray. Chim., Pays-Bas* 57 (1943).

\* cited by examiner

*Primary Examiner* — Marc Zimmer
(74) *Attorney, Agent, or Firm* — Drinker Biddle & Reath LLP

(57) ABSTRACT

The present invention relates to a process for producing a composite material composed of
a) at least one oxidic phase and
b) an organic polymer phase. The copolymerization of at least one compound of the formula I $$[(ArO)_m MO_n R_r H_p]_q \qquad (I)$$

in which
M is B, Al, Ga, In, Si, Ge, Sn, P, As or Sb,
Ar is phenyl or naphthyl,
R is alkyl, alkenyl, cycloalkyl or aryl, where aryl is unsubstituted or may have one or more substituents,
with formaldehyde or formaldehyde equivalents, in a reaction medium which is essentially anhydrous, to obtain a composite material having an arrangement of phase domains similar to those nanocomposite materials obtainable by twin polymerization, and to the use of the composite material for production of gas storage materials, rubber mixtures, low-K dielectrics and electrode materials for lithium ion batteries.

14 Claims, No Drawings

PROCESS FOR PRODUCING A COMPOSITE MATERIAL

CROSS-REFERENCE TO RELATED APPLICATIONS

This application claims benefit (under 35 USC 119(e)) of U.S. Provisional Application 61/664,192, filed Jun. 26, 2012, which is incorporated by reference.

The present invention relates to a process for producing a composite material composed of a) at least one oxidic phase and
b) at least one organic polymer phase.

In recent times, there have been various descriptions of the production of composite materials by what is called twin polymerization (see, for example, Spange et al., Angew. Chem. Int. Ed., 46 (2007) 628-632, WO 2009/083083, WO 2009/133086, WO 2010/112581 and WO2010/128144). Twin polymerization involves polymerizing compounds which possess a plurality of arylmethyl groups bonded to a metal or semimetal atom via one or two heteroatom(s), preferably one or two oxygen atom(s).

Twin polymerization affords composite materials which typically have at least one oxidic phase and at least one organic polymer phase, in which the phase domains have a co-continuous arrangement and dimensions in the region of a few nanometers (distance between adjacent identical phases). It is assumed that the specific phase arrangement and the small distances between adjacent phases are a consequence firstly of the kinetic coupling of the polymerization of the arylmethyl units in the twin monomers, and secondly of the formation of the silicon dioxide. As a result, the phase constituents form more or less synchronously, and phase separation into the inorganic phase and the organic phase takes place as early as during the polymerization of the twin monomers.

Preferred twin monomers are spirocyclic compounds as described in WO 2009/083083. In these spirocyclic compounds, two 1-oxy-2-(oxymethyl)aryl groups are joined together via their oxygen atoms to a metal or semimetal atom to give a spirocyclic structure. One example of such a spirocyclic compound is 2,2'-spirobi[4H-1,3,2-benzodioxasilin]:

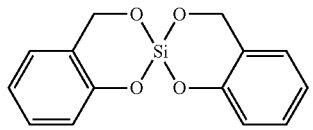

The spirocyclic compounds can be prepared by the method described in WO 2009/083083, in a comparatively simple manner, by reacting 1-hydroxy-2-hydroxymethylaromatics such as 1-hydroxy-2-hydroxymethylbenzene (saligenin) with metal alkoxides or semimetal alkoxides, but the preparation of the starting materials, namely the 1-hydroxy-2-hydroxymethyl aromatics, is comparatively complex. Although 1-hydroxy-2-hydroxymethyl aromatics are formally monoaddition products of formaldehyde onto hydroxy aromatics, the addition of formaldehyde onto hydroxy aromatics such as phenol generally leads not to the desired monoadduct, but to the o,o-bishydroxymethyl compound (see Rec. Tray. Chinn. Pays-Bas 62, 57 (1943)). It is also known that o-hydroxyarylcarboxylic acids such as salicylic acid can be reduced with suitable reducing agents to the corresponding 1-hydroxy-2-hydroxymethylaromatics (see J. Chem. Soc. PT1, (1981) 1942-1952 and Bull. Chem. Soc. Jap. 56, 719-723, (1983)), or that phenyl borate can be reacted with formaldehyde to give the monoadduct and then the o-hydroxymethylphenyl borate formed can be hydrolyzed to saligenin (see FR 2626575). A common feature of all these processes is that they lead to good and reproducible results in the laboratory by virtue of purifying operations, but are complicated to perform overall. Incomplete conversion or byproducts lead to product loss. Therefore, access to the Spiro compounds described in WO 2009/083083 is complex and remains severely restricted, which has to date been a barrier to industrial use of twin polymerization for production of nanocomposite materials.

DE 1816241 discloses the preparation of soluble metal or semimetal-containing phenol-formaldehyde resins, in which either particular metal or semimetal phenoxides are reacted with substoichiometric amounts of formaldehyde, or novolacs, i.e. phenol-formaldehyde condensates, are reacted with selected inorganic metal or semimetal compounds. The production of composite materials with a phase structure whose phase domains have dimensions in the nanometer range is not described.

It has now been found that, surprisingly, copolymerization of at least one compound which is described by the following general formula I

in which
M is B, Al, Ga, In, Si, Ge, Sn, P, As or Sb,
m is 1, 2 or 3,
n is 0 or 1,
r is 0, 1 or 2,
p is 1, 2 or 3,
q is 1 or an integer >1, for example an integer from 2 to 20, especially an integer from 3 to 6,
m+2n+r+p is 1, 2, 3, 4 or 5 and corresponds to the valency of M,
Ar is phenyl or naphthyl, where the phenyl ring or the naphthyl ring is unsubstituted or may have one or more, for example 1, 2 or 3, substituents selected independently from alkyl, cycloalkyl, alkoxy, cycloalkoxy and $NR^aR^b$ in which $R^a$ and $R^b$ are each independently hydrogen, alkyl or cycloalkyl,
R is alkyl, alkenyl, cycloalkyl or aryl, where aryl is unsubstituted or may have one or more substituents selected independently from alkyl, cycloalkyl, alkoxy, cycloalkoxy and $NR^aR^b$ in which $R^a$ and $R^b$ are each as defined above,
with at least one compound selected from formaldehyde and formaldehyde equivalents, in a reaction medium which is essentially anhydrous, can produce composite materials having an arrangement of phase domains similar to those nanocomposite materials obtainable by twin polymerization as described in the prior art.

This is surprising since it has been assumed to date that the formation of nanocomposite materials is attributable to the structural units present in twin monomers, which have arylmethylene groups bonded covalently to a metal or semimetal via a heteroatom. It has been assumed to date that these structural units bring about kinetic coupling of the polymerization of the organic molecular moiety of the twin monomers and of the formation of the "inorganic polymer", namely the inorganic phase, since polymerization and formation of the inorganic phase have a common reaction step, namely the breaking of the bond between the methylene carbon of the arylmethylene group and the heteroatom bearing the (semi) metal. The resulting kinetic coupling was considered to be the cause of the formation of the characteristic nanostructures in the twin polymerization. However, the compounds of the formula I do not have the characteristic structural units of the twin monomers.

The present invention thus relates to a process for producing composite materials consisting essentially of
a) at least one oxidic phase and
b) at least one organic polymer phase,
comprising the copolymerization of at least one compound which is described by the following general formula I

in which
m is 1, 2 or 3,
n is 0 or 1,
r is 0, 1 or 2,
p is 1, 2 or 3,
q is 1 or an integer >1, for example an integer from 2 to 20, especially an integer from 3 to 6,
m+2n+r+p is 1, 2, 3, 4 or 5 and corresponds to the valency of M,
Ar is phenyl or naphthyl, where the phenyl ring or the naphthyl ring is unsubstituted or may have one or more, for example 1, 2 or 3, substituents selected independently from alkyl, cycloalkyl, alkoxy, cycloalkoxy and $NR^aR^b$ in which $R^a$ and $R^b$ are each independently hydrogen, alkyl or cycloalkyl,
R is alkyl, alkenyl, cycloalkyl or aryl, where aryl is unsubstituted or may have one or more substituents selected independently from alkyl, cycloalkyl, alkoxy, cycloalkoxy and $NR^aR^b$ in which $R^a$ and $R^b$ are each as defined above,
with at least one compound selected from formaldehyde and formaldehyde equivalents in a reaction medium which is essentially anhydrous.

The process according to the invention is associated with a number of advantages. Firstly, the process according to the invention affords composite materials as also obtained in twin polymerization, i.e. composite materials consisting of
a) at least one oxidic phase and
b) at least one organic polymer phase,
said oxidic phase and said organic polymer phase consisting essentially of phase domains in which the mean distance between adjacent phase domains of identical phases is very small. Unlike the case of twin polymerization, however, no starting materials which are difficult to obtain are needed, such as the Spiro compounds mentioned at the outset or labile arylmethyl (semi)metalates such as tetrakis(furylmethyloxy) silane, in order to arrive at the desired composite materials. Instead, it is possible to use readily obtainable and comparatively stable starting materials in the form of the compounds of the formula I, which allows production of the composite materials on a larger scale.

In addition, the process according to the invention enables, through selection of suitable compounds of the formula I or mixtures of compounds of the formula I, the controlled modification of the substance properties of the composite material obtainable thereby. For example, the properties of the inorganic polymer phase can be modified by copolymerizing mixtures of different compounds of the formula I which differ in terms of the type of metal, semimetal or nonmetal. In an analogous manner, it is possible, for example, to modify the properties of the organic polymer phase by copolymerizing mixtures of different compounds of the formula I which differ in terms of the type of aryl group. It is equally possible, for example, to modify the properties of the organic and inorganic polymer phase by copolymerizing mixtures of different compounds of the formula I which differ both in the type of metal, semimetal or nonmetal M and in the aryloxy group ArO.

As already mentioned, the process according to the invention affords composite materials which consist of at least one oxidic phase and at least one organic polymer phase, said oxidic phase and said organic polymer phase consisting essentially of phase domains in which the mean distance between adjacent phase domains of identical phases is very small. The mean distance between adjacent phase domains of identical phases is typically less than 200 nm, frequently less than 50 nm, especially less than 10 nm. Adjacent phase domains of identical phases are understood to mean two phase domains of two identical phases which are separated by one phase domain of the other phase, for example two phase domains of the oxide phase which are separated by one phase domain of the organic polymer phase, or two phase domains of the polymer phase which are separated by one phase domain of the oxide phase.

Formula I should be understood as an empirical formula; it indicates the type and number of the structural units characteristic of the compounds of the formula I, namely the atom M and the groups bonded to the atom M, i.e. the aryloxy group ArO, the oxygen atom O, the carbon-bonded radicals R and the hydrogen atoms H. The $[(ArO)_mMO_nR_rH_p]_q$ units, when q>1, may form mono- or polycyclic structures or linear structures.

Compounds of the formula I can be regarded as compounds based on monohydroxyaromatics, which in a formal sense have 1, 2 or 3 aryloxy groups Ar—O or anions derived from monohydroxyaromatics by deprotonation of the aromatic hydroxyl function, with bonding of the aryloxy group(s) or anion(s) Ar—O derived from the monohydroxyaromatic Ar—OH to a metal, semimetal or nonmetal atom M via the deprotonated oxygen atom of the hydroxyl group of the monohydroxyaromatic. Accordingly, the Ar—O radical in formula I corresponds to an aryloxy group or aryloxy anion derived by deprotonation of the aromatic hydroxyl function of a hydroxyaromatic.

Suitable monohydroxyaromatics Ar—OH are in particular phenol, α-naphthol or β-naphthol, which are unsubstituted or have one or more, for example 1, 2, 3 or 4, substituents which are typically selected from alkyl, cycloalkyl, alkoxy, cycloalkoxy and $NR^aR^b$ in which $R^a$ and $R^b$ are each independently hydrogen, alkyl or cycloalkyl.

The compounds of the formula I have one or more atoms M and may, in the case of a plurality of atoms M, have linear, branched, monocyclic or polycyclic structures.

The compounds of the formula I in a formal sense have 1, 2 or 3 hydrogen atoms bonded to the atom M.

The compounds of the formula I may also in a formal sense have 1 or 2 substituents R on the atom M, where the substituents R are selected from alkyl, alkenyl, cycloalkyl and aryl, where aryl is unsubstituted or may have one or more substituents selected independently from alkyl, cycloalkyl, alkoxy, cycloalkoxy and $NR^aR^b$ in which $R^a$ and $R^b$ are each independently hydrogen, alkyl or cycloalkyl.

The compounds of the formula I may also in a formal sense have one oxygen atom on the atom M.

The total number of groups bonded to the atom M is typically determined by the valency of the atom M to which the abovementioned groups are bonded and corresponds to the sum of m+2n+r+p.

Here and hereinafter, the terms "alkyl", "alkenyl", "cycloalkyl", "alkoxy", "cycloalkoxy" and "aryl" are collective terms for monovalent organic radicals with the usual definition thereof, where alkyl and alkoxy typically have 1 to 20, frequently 1 to 10 and especially 1 to 4 carbon atoms, and cycloalkyl and cycloalkoxy typically 3 to 20, frequently 3 to 10 and especially 5 or 6 carbon atoms. The possible number of carbon atoms in a radical is typically specified by the prefix $C_x$-$C_y$, where x is the minimum and y is the maximum carbon number.

Alkyl is a saturated, linear or branched hydrocarbyl radical which has typically 1 to 20, frequently 1 to 10 and especially 1 to 4 carbon atoms, and which is, for example, methyl, ethyl, n-propyl, isopropyl, n-butyl, 2-butyl, isobutyl, tert-butyl, n-pentyl, 2-methylbutyl, 1-methylbutyl, 3-pentyl, n-hexyl, n-heptyl, n-octyl, 1-methylheptyl, 2-methylheptyl, 2-ethylhexyl, n-nonyl, 1-methylnonyl, n-decyl, 3-propylheptyl and the like.

Alkenyl is an olefinically unsaturated, linear or branched hydrocarbyl radical which has typically 2 to 20, frequently 2 to 10 and especially 2 to 6 carbon atoms and which is, for example, vinyl, 1-propenyl, 2-propenyl, 1-methylethenyl, 1-methyl-1-propenyl, 2-methyl-1-propenyl, 1-methyl-2-propenyl, 2-methyl-2-propenyl, 1-pentenyl, 2-pentenyl, 3-pentenyl, 4-pentenyl, 1-methyl-1-butenyl, 2-methyl-1-butenyl, 3-methyl-1-butenyl, 1-methyl-2-butenyl, 2-methyl-2-butenyl, 3-methyl-2-butenyl, 1-methyl-3-butenyl, 2-methyl-3-butenyl, 3-methyl-3-butenyl, 1,1-dimethyl-2-propenyl, 1,2-dimethyl-1-propenyl, 1,2-dimethyl-2-propenyl, 1-ethyl-1-propenyl, 1-ethyl-2-propenyl, 1-hexenyl, 2-hexenyl, 3-hexenyl, 4-hexenyl, 5-hexenyl, 1-methyl-1-pentenyl, 2-methyl-1-pentenyl, 3-methyl-1-pentenyl, 4-methyl-1-pentenyl, 1-methyl-2-pentenyl, 2-methyl-2-pentenyl, 3-methyl-2-pentenyl, 4-methyl-2-pentenyl, 1-methyl-3-pentenyl, 2-methyl-3-pentenyl, 3-methyl-3-pentenyl, 4-methyl-3-pentenyl, 1-methyl-4-pentenyl, 2-methyl-4-pentenyl, 3-methyl-4-pentenyl, 4-methyl-4-pentenyl, 1,1-dimethyl-2-butenyl, 1,1-dimethyl-3-butenyl, 1,2-dimethyl-1-butenyl, 1,2-dimethyl-2-butenyl, 1,2-dimethyl-3-butenyl, 1,3-dimethyl-1-butenyl, 1,3-dimethyl-2-butenyl, 1,3-dimethyl-3-butenyl, 2,2-dimethyl-3-butenyl, 2,3-dimethyl-1-butenyl, 2,3-dimethyl-2-butenyl, 2,3-dimethyl-3-butenyl, 3,3-dimethyl-1-butenyl, 3,3-dimethyl-2-butenyl, 1-ethyl-1-butenyl, 1-ethyl-2-butenyl, 1-ethyl-3-butenyl, 2-ethyl-1-butenyl, 2-ethyl-2-butenyl, 2-ethyl-3-butenyl, 1,1,2-trimethyl-2-propenyl, 1-ethyl-1-methyl-2-propenyl, 1-ethyl-2-methyl-1-propenyl and 1-ethyl-2-methyl-2-propenyl.

Alkoxy is an alkyl radical as defined above bonded via an oxygen atom, which has typically 1 to 20, frequently 1 to 10 and especially 1 to 4 carbon atoms and which is, for example, methoxy, ethoxy, n-propoxy, isopropoxy, n-butoxy, 2-butoxy, isobutoxy, tert-butoxy, n-pentyloxy, 2-methylbutyloxy, 1-methylbutyloxy, n-hexyloxy, n-heptyloxy, n-octyloxy, 1-methylheptyloxy, 2-methylheptyloxy, 2-ethylhexyloxy, n-nonyloxy, 1-methylnonyloxy, n-decyloxy, 3-propylheptyloxy and the like.

Cycloalkyl is a mono-, bi- or tricyclic, saturated cycloaliphatic radical which has typically 3 to 20, frequently 3 to 10 and especially 5 or 6 carbon atoms and which is, for example, cyclopropyl, cyclobutyl, cyclopentyl, cyclohexyl, cycloheptyl, cyclooctyl, bicyclo[2.2.1]hept-1-yl, bicyclo[2.2.1]hept-2-yl, bicyclo[2.2.1]hept-7-yl, bicyclo[2.2.2]octan-1-yl, bicyclo[2.2.2]octan-2-yl, 1-adamantyl or 2-adamantyl.

Cycloalkyloxy is a mono-, bi- or tricyclic, saturated cycloaliphatic radical bonded via an oxygen atom, which has typically 3 to 20, frequently 3 to 10 and especially 5 or 6 carbon atoms, and which is, for example, cyclopropyloxy, cyclobutyloxy, cyclopentyloxy, cyclohexyloxy, cycloheptyloxy, cyclooctyloxy, bicyclo[2.2.1]hept-1-yloxy, bicyclo[2.2.1]hept-2-yloxy, bicyclo[2.2.1]hept-7-yloxy, bicyclo[2.2.2]octan-1-yloxy, bicyclo[2.2.2]octan-2-yloxy, 1-adamantyloxy or 2-adamantyloxy.

Aryl is a mono- or polycyclic aromatic hydrocarbyl radical, for example phenyl, 1-naphthyl or 2-naphthyl.

In the preferred compounds of the formula I, the atoms M are selected from B, Si, Sn and P, especially from Si and Sn. In a specific embodiment of the invention, M is Si, i.e. the compound of the formula I is selected from compounds of the formula I in which the atom M comprises at least 90 mol %, based on the total amount of atoms M, of silicon.

In a preferred embodiment of the invention, r in formula I is 0, which means that the atom M does not bear any R radicals. In another preferred embodiment of the invention, at least two different compounds of the formula I are copolymerized with formaldehyde or a formaldehyde equivalent, where the variable r is 0 in at least one of the compounds of the formula I and variable r is 0 in at least one further compound of the formula I.

Irrespective of this, the variables m, n, r, p, Ar and R in formula I, alone or in combination, and especially in combination with one of the preferred and particularly preferred definitions of M, are preferably each defined as follows:

m is 1, 2 or 3;
n is 0 or 1;
r is 0, 1 or 2;
p is 1, 2 or 3;
Ar is phenyl which is unsubstituted or may have 1, 2 or 3 substituents selected from alkyl, especially $C_1$-$C_4$-alkyl, cycloalkyl, especially $C_3$-$C_{10}$-cycloalkyl, alkoxy, especially $C_1$-$C_4$-alkoxy, cycloalkoxy, especially $C_3$-$C_{10}$-cycloalkoxy and $NR^aR^b$ in which $R^a$ and $R^b$ are each independently hydrogen, alkyl, especially $C_1$-$C_4$-alkyl, or cycloalkyl, especially $C_3$-$C_{10}$-cycloalkyl;
R if present is $C_1$-$C_6$-alkyl, $C_2$-$C_6$-alkenyl, $C_3$-$C_{10}$-cycloalkyl or phenyl, especially $C_1$-$C_4$-alkyl, $C_5$-$C_6$-cycloalkyl or phenyl.

More particularly, the variables m, n, r, p, Ar and R in formula I, alone or in combination, and especially in combination with one of the preferred and particularly preferred definitions of M, are preferably each defined as follows:

m is 1, 2 or 3;
n is 0 or 1;
r is 0 or 1;
p is 1 or 2;
Ar is phenyl which is unsubstituted or may have 1, 2 or 3 substituents selected from alkyl, especially $C_1$-$C_4$-alkyl, and alkoxy, especially $C_1$-$C_4$-alkoxy;
R if present is $C_1$-$C_6$-alkyl, $C_2$-$C_6$-alkenyl, $C_3$-$C_{10}$-cycloalkyl or phenyl, especially $C_1$-$C_4$-alkyl, $C_5$-$C_6$-cycloalkyl or phenyl.

If the compound of the formula I has a plurality of ArO radicals, the individual Ar radicals may be the same or different. Equally, in the case of a plurality of R radicals, these may be the same or different.

A preferred embodiment of the compounds of the formula I is that of those compounds in which q is 1. Such compounds can be regarded as orthoesters of the parent oxo acid of the atom M. In these compounds, the variables m, n, r, p, M, Ar and R are each as defined above and especially, alone or specifically in combination, have one of the preferred or particularly preferred definitions.

A particularly preferred embodiment of the compounds of the formula I is that of those compounds in which M is selected from B, Si, Sn and P, m is 2 or 3, n is 0 or 1, r is 0, p is 1 or 2 and q is 1. Ar therein has the aforementioned definitions and especially the definitions mentioned with preference, and is especially phenyl which is unsubstituted or may have 1, 2 or 3 substituents selected from alkyl, especially $C_1$-$C_4$-alkyl, and alkoxy, especially $C_1$-$C_4$-alkoxy.

A very particularly preferred embodiment of the compounds of the formula I is that of those compounds in which M is selected from B, Si and Sn, m is 2 or 3, n is 0, r is 0, p is 1 or 2 and q is 1. Ar therein has the aforementioned definitions and especially the definitions mentioned with preference, and is especially phenyl which is unsubstituted or may have 1, 2 or 3 substituents selected from alkyl, especially $C_1$-$C_4$-alkyl, and alkoxy, especially $C_1$-$C_4$-alkoxy.

A specific embodiment of the compounds of the formula I is that of those compounds in which M is Si, m is 1, 2 or 3, n is 0, r is 0 or 1, p is 1, 2 or 3 and q is 1. Ar therein has the aforementioned definitions and especially the definitions mentioned with preference, and is especially phenyl which is unsubstituted or may have 1, 2 or 3 substituents selected from alkyl, especially $C_1$-$C_4$-alkyl, and alkoxy, especially $C_1$-$C_4$-alkoxy.

Examples of compounds of the formula I which are preferred in accordance with the invention and in which q is 1 are diphenoxymethylsilane, triphenoxysilane and diphenoxysilane.

A further specific embodiment of the compounds of the formula I is that of those compounds in which M is Si, m is 1, 2 or 3, n is 0, r is 0 or 1, p is 1, 2 or 3 and q is 1. Ar therein has the aforementioned definitions and especially the definitions mentioned with preference, and is especially phenyl which is unsubstituted or may have 1, 2 or 3 substituents selected from alkyl, especially $C_1$-$C_4$-alkyl, and alkoxy, especially $C_1$-$C_4$-alkoxy. In these compounds, R is as defined for formula I; more particularly, R is methyl, ethyl, phenyl, vinyl or allyl. Examples of preferred compounds of the formula I of this embodiment are diphenoxymethylsilane, triphenoxysilane and diphenoxysilane.

Suitable compounds of the formula I are also "condensation products" of compounds of the formula I where q is 1. These compounds generally have the empirical formula of the formula I in which q is an integer greater than 1, for example an integer in the range from 2 to 20 and especially 3, 4, 5 or 6. Such compounds derive in a formal sense from compounds of the formula I where q is 1 by condensation, with formal condensation of two ArO units to form an Ar—O—Ar molecule and removal of an $M(ArO)_{m-2}O_{n+1}R_rH_p$ unit. They are accordingly formed essentially from the structural elements of the following formula Ia

—[—O-A-]— (Ia)

in which -A- is a $>M(ArO)_{m-2}O_nR_rH_p$ group in which M, Ar and R each have the aforementioned definitions, especially those mentioned as preferred or particularly preferred,
m is 3,
n is 0,
r is 0,
p is 1,
m+2n+r+p is 3, 4 or 5 and corresponds to the valency of M.

In a preferred embodiment, the condensation product is cyclic and q is 3, 4 or 5. Such compounds can be described especially by the following structure Ib

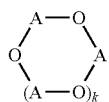

(Ib)

in which k is 1, 2 or 3 and -A- is a $>M(ArO)_{m-2}O_nR_rH_p$ group in which M, Ar and R have the definitions mentioned above for formula I, and m, n, r and p have the definitions mentioned above in connection with structure Ia.

In a further preferred embodiment, the condensation product is linear and is saturated at each end with an ArO unit. In other words, such compounds can be described by the following structure Ic:

Ar—[—O-A-]$_s$-OAr (Ic)

in which s is an integer in the range from 2 to 20 and -A- is a $>M(ArO)_{m-2}O_nR_rH_p$ group in which M, Ar and R have the definitions mentioned above for formula I, and m, n, r and p have the definitions mentioned above in connection with structure Ia. Particular preference is given to this embodiment when compounds have a distribution with regard to the number of repeat units, i.e. have different s. For example, mixtures may be present in which at least 99%, 90%, 80% or 60% of the mass is present as an oligomer mixture where
s is 2 to 6 or s is 4 to 9 or s is 6 to 15 or s is 12 to 20.

Examples of such condensation products are triphenoxycyclotrisiloxane or tetraphenoxycyclotetrasiloxane.

The compounds of the formula I are known or can be prepared in analogy to known methods for preparation of phenoxides; see, for example, O. F. Senn, WADC Technical Report 54-339, SRI (1955), DE 1816241, Z. Anorg. Allg. Chem. 551, 61-66 (1987), Houben-Weyl, volume VI-2 35-41, Z. Chem. 5, 122-130 (1965).

In a further embodiment of the invention, the compounds of the formula I comprise at least two different compounds V1 and V2. The compounds V1 and V2 preferably differ in terms of at least one of the following features (1) to (4): (1) difference in Ar, (2) difference in M, (3) difference in r, i.e., number of R radicals, (4) difference in p, i.e., number of hydrogen atoms bonded to M. For example, compound V1 is selected from compounds of the formula I in which M is B, Si, Sn or P and especially B, Si or Sn, m is 1, 2 or 3, n is 0 or 1, especially 0, r is 0, p is 1 or 2. Compound V2 is selected, for example, from compounds of the formula I in which M is selected from B, Si, Sn and P and M is especially Si or Sn, m is 1, 2 or 3, n is 0 or 1, especially 0, r is 1 or 2, p is 1, 2 or 3. Ar in the compounds V1 and V2 may be the same or different, where Ar has the aforementioned definitions and especially the definitions mentioned with preference, and is especially phenyl which is unsubstituted or may have 1, 2 or 3 substituents selected from alkyl, especially $C_1$-$C_4$-alkyl, and alkoxy, especially $C_1$-$C_4$-alkoxy. R is then preferably $C_1$-$C_8$-alkyl, $C_3$-$C_{10}$-cycloalkyl or phenyl, especially $C_1$-$C_4$-alkyl, $C_5$-$C_6$-cycloalkyl or phenyl.

The molar ratio of the compound V1 to the compound V2 in this embodiment can be varied over wide ranges and will typically be in the range from 1:1000 to 1000:1, frequently in the range from 100:1 to 1:100 or in the range from 50:1 to 1:50.

In a further, more specific embodiment of the invention, the compounds of the formula I comprise at least two different compounds V1 and V2, where compound V1 is selected from compounds of the formula I in which M is B, Al, Ga, In, Ge, Sn, P, As or Sb and especially B, Sn or P, m is 1, 2 or 3, n is 0 or 1, r is 0, 1 or 2, p is 1, 2 or 3, and compound V2 is selected from compounds of the formula I in which M is Si, m is 1, 2 or 3, n is 0, r is 0, 1 or 2, p is 1, 2 or 3. Ar in the compounds V1 and V2 may be the same or different, where Ar has the aforementioned definitions and especially the definitions mentioned with preference, and is especially phenyl which is unsubstituted or may have 1, 2 or 3 substituents selected from alkyl, especially $C_1$-$C_4$-alkyl, and alkoxy, especially $C_1$-$C_4$- alkoxy. R is then preferably $C_1$-$C_6$-alkyl, $C_3$-$C_{10}$-cycloalkyl or phenyl, especially $C_1$-$C_4$-alkyl, $C_5$-$C_6$-cycloalkyl or phenyl.

The molar ratio of the compound V1 to the compound V2 in this embodiment can be varied over wide ranges and will typically be in the range from 1:1000 to 1000:1, frequently in the range from 100:1 to 1:100 or in the range from 50:1 to 1:50.

The compounds of the formula I can also be used together with one or more compounds of the formula II:

$$[(Ar'O)_a M'O_c R'_b]_d \quad (II)$$

in which

M' is a metal, a semimetal, or a nonmetal other than carbon and nitrogen which forms oxo acids, preferably one of the definitions given for M in formula I, especially one of the definitions given as preferred therein;

a is 1, 2, 3, 4, 5 or 6, b is 0, 1 or 2, c is 0, 1 or 2, d is 1 or an integer >1, for example an integer from 2 to 20, especially an integer from 3 to 6, a+b+2c is 1, 2, 3, 4, 5 or 6 and corresponds to the valency of M', Ar' has one of the definitions given in formula I for Ar, especially one of the definitions given as preferred therein;

R' has one of the definitions given in formula I for R, especially one of the definitions given as preferred therein.

If the compound of the formula II has a plurality of Ar'O radicals, the individual Ar' radicals may be the same or different. Equally, in the case of a plurality of R' radicals, these may be the same or different.

In formula II, M' is a metal or semimetal or a nonmetal which forms oxo acids and is different than carbon and nitrogen, the metals, semimetals and nonmetals generally being selected from the elements of the following groups of the Periodic Table other than nitrogen and carbon: IA such as Li, Na or K, IIA such as Mg, Ca, Sr or Ba, IIIA such as B, Al, Ga or In, IVA such as Si, Ge or Sn, VA such as P, As or Sb, VIA such as S, Se or Te, IVB such as Ti or Zr, VB such as V, VIB such as Cr, Mo or W and VIIB such as Mn. M' is preferably selected from the elements other than carbon and nitrogen from groups IIIA, IVA, VA and IVB of the Periodic Table, and among these especially from the elements of the 2nd, 3rd and 4th periods. M' is more preferably selected from B, Si, Sn, Ti and P. In a particularly preferred embodiment of the invention, M' is B or Si and is especially Si.

In a preferred embodiment of the invention, b in formula II is 0, which means that the atom M' does not bear any R' radicals.

Irrespective of this, the variables a, b, c, Ar' and R' in formula II, alone or in combination, and especially in combination with one of the preferred and particularly preferred definitions of M', are preferably each defined as follows:

a is 2, 3 or 4;

c is 0 or 1;

b is 0, 1 or 2;

Ar' is phenyl which is unsubstituted or may have 1, 2 or 3 substituents selected from alkyl, especially $C_1$-$C_4$-alkyl, cycloalkyl, especially $C_3$-$C_{10}$-cycloalkyl, alkoxy, especially $C_1$-$C_4$-alkoxy, cycloalkoxy, especially $C_3$-$C_{10}$-cycloalkoxy and $NR^a R^b$ in which $R^a$ and $R^b$ are each independently hydrogen, alkyl, especially $C_1$-$C_4$-alkyl, or cycloalkyl, especially $C_3$-$C_{10}$-cycloalkyl;

R' if present is $C_1$-$C_6$-alkyl, $C_2$-$C_6$-alkenyl, $C_3$-$C_{10}$-cycloalkyl or phenyl, especially $C_1$-$C_4$-alkyl, $C_5$-$C_6$-cycloalkyl or phenyl.

More particularly, the variables a, b, c, Ar' and R' in formula II, alone or in combination, and especially in combination with one of the preferred and particularly preferred definitions of M', are preferably each defined as follows:

a is 1, 2, 3 or 4;

c is 0 or 1;

b is 0;

Ar' is phenyl which is unsubstituted or may have 1, 2 or 3 substituents selected from alkyl, especially $C_1$-$C_4$-alkyl, and alkoxy, especially $C_1$-$C_4$-alkoxy.

A preferred embodiment of the compounds of the formula II is that of those compounds of the formula II in which d is the number 1. Such compounds can be regarded as orthoesters of the parent oxo acid of the central atom M'. In these compounds, the variables a, b, c, M', Ar' and R' are each as defined above and, especially in combination, have one of the preferred or particularly preferred definitions.

A particularly preferred embodiment of the compounds of the formula II is that of those compounds of the formula II in which M' is selected from B, Si, Sn, Ti and P, a is 3 or 4, c is 0 or 1 and b is 0 and d=1. Ar' therein has the aforementioned definitions and especially the definitions mentioned with preference, and is especially phenyl which is unsubstituted or may have 1, 2 or 3 substituents selected from alkyl, especially $C_1$-$C_4$-alkyl, and alkoxy, especially $C_1$-$C_4$-alkoxy.

A very particularly preferred embodiment of the compounds of the formula II is that of those compounds of the formula II in which M' is selected from B, Si and Sn, a is 3 or 4, c is 0 and b is 0 and d=1. Ar' therein has the aforementioned definitions and especially the definitions mentioned with preference, and is especially phenyl which is unsubstituted or may have 1, 2 or 3 substituents selected from alkyl, especially $C_1$-$C_4$-alkyl, and alkoxy, especially $C_1$-$C_4$-alkoxy.

A specific embodiment of the compounds of the formula II is that of those compounds of the formula II in which M' is Si, a is 4, c is 0 and b is 0. Ar' therein has the aforementioned definitions and especially the definitions mentioned with preference, and is especially phenyl which is unsubstituted or may have 1, 2 or 3 substituents selected from alkyl, especially $C_1$-$C_4$-alkyl, and alkoxy, especially $C_1$-$C_4$-alkoxy.

Examples of compounds of the formula II where d=1 which are preferred in accordance with the invention are tetraphenoxysilane, tetra(4-methylphenoxy)silane, triphenyl borate, triphenyl phosphate, tetraphenyl titanate, tetracresyl titanate and tetraphenyl stannate.

A further specific embodiment of the compounds of the formula II is that of those compounds of the formula II in which M' is Si, a is 1, 2 or 3, c is 0 and b is 4−a. Ar' therein has the aforementioned definitions and especially the definitions mentioned with preference, and is especially phenyl which is unsubstituted or may have 1, 2 or 3 substituents selected from alkyl, especially $C_1$-$C_4$-alkyl, and alkoxy, especially $C_1$-$C_4$-alkoxy. In these compounds, R' is as defined for formula II; more particularly, R' is methyl, ethyl, phenyl, vinyl or allyl. Examples of preferred compounds of the formula II in this embodiment are methyl(triphenoxy)silane, dimethyl(diphenoxy)silane, trimethyl(phenoxy)silane, phenyl(triphenoxy)silane and diphenyl(diphenoxy)silane.

Suitable compounds of the formula II are also "condensation products" of compounds of the formula II where d=1. These compounds generally have the empirical formula II in which d is an integer >1, for example an integer in the range from 2 to 20 and especially 3, 4, 5 or 6. Such compounds derive in a formal sense from compounds of the formula II where d=1 by condensation, with removal in a formal sense in each case of two Ar'O units to form an Ar'-O—Ar' molecule and of an M'(OAr')$_{a-2}$(O)$_{c+1}$R$_b$ unit. They are accordingly formed essentially from the structural elements of the following formula IIa:

$$—[—O-A'-]—\qquad(\text{IIa})$$

in which -A'- is a >M'(Ar'O)$_{a-2}$(O)$_c$(R')$_b$ group in which M', Ar' and R' each have the aforementioned definitions, especially those mentioned as preferred or particularly preferred,
a is 3 or 4,
c is 0 or 1 and especially 0,
b is 0 or 1 and especially 0,
a+b+2c is 3, 4, 5 or 6 and corresponds to the valency of M'.

M' in the formula A' is preferably Si, Sn, B and P.

In a preferred embodiment, the condensation product is cyclic and d is 3, 4 or 5. Such compounds can be described especially by the following structure IIb

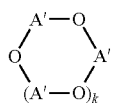
(IIb)

in which k is 1, 2 or 3 and -A'- is a >M'(Ar'O)$_{a-2}$(O)$_c$(R')$_b$ group in which M', Ar' and R' have the definitions mentioned above for formula II, and a, c and b have the definitions mentioned above in connection with structure IIa.

In a further preferred embodiment, the condensation product is linear and is saturated at the ends with an Ar'O unit. In other words, such compounds can be described by the following structure IIc:

$$\text{Ar'}—[—O-A'-]_d—OAr'\qquad(\text{IIc})$$

in which d is an integer in the range from 2 to 20 and -A'- is a >M'(Ar'O)$_{a-2}$(O)$_c$(R')$_b$ group in which M', Ar' and R' have the definitions mentioned above for formula II, and a, b and c have the definitions mentioned above in connection with structure IIa. Particular preference is given to this embodiment when compounds have a distribution with regard to the number of repeat units, i.e. have different d. For example, mixtures may be present in which at least 99%, 90%, 80% or 60% of the mass is present as an oligomer mixture where d=2 to 6 or d=4 to 9 or d=6 to 15 or d=12 to 20.

Examples of such condensation products are triphenyl metaborate, hexaphenoxycyclotrisiloxane or octaphenoxycyclotetrasiloxane.

The compounds of the formula II are known or can be prepared in analogy to known methods for preparation of phenoxides; see, for example, O. F. Senn, WADC Technical Report 54-339, SRI (1955), DE 1816241, Z. Anorg. Alig. Chem. 551, 61-66 (1987), Houben-Weyl, volume VI-2 35-41, Z. Chem. 5, 122-130 (1965).

When a mixture of at least one compound of the formula I and at least one compound of the formula II is copolymerized with the formaldehyde or formaldehyde equivalent, the molar ratio of the compound of the formula I to the compound of the formula II can be varied over wide ranges and will typically be in the range from 1:1000 to 1000:1, frequently in the range from 100:1 to 1:100 or in the range from 50:1 to 1:50.

In the process according to the invention, the compounds of the formula I or the mixture of the compound of the formula I with the compound of the formula II on the one hand, and formaldehyde or the formaldehyde equivalent on the other hand, are used in such an amount that the molar ratio of formaldehyde, or the molar ratio of the formaldehyde present in the formaldehyde equivalent, to the aryloxy groups ArO or Ar'O present in the compounds of the formula I and optionally of the formula II is preferably at least 0.9:1, particularly at least 1:1, particularly at least 1.01:1, even more preferably at least 1.05:1 and especially at least 1.1:1. Greater excesses of formaldehyde are generally uncritical but unnecessary, and so formaldehyde or the formaldehyde equivalent are typically used in such an amount that the molar ratio of formaldehyde, or the molar ratio of the formaldehyde present in the formaldehyde equivalent, to the aryloxy groups ArO or Ar'O present in the compounds of the formula I and optionally of the formula II does not exceed a value of 10:1, preferably 5:1 and especially 2:1. Formaldehyde or the formaldehyde equivalent is preferably used in such an amount that the molar ratio of formaldehyde, or the molar ratio of the formaldehyde present in the formaldehyde equivalent, to the aryloxy groups ArO or ArO present in the compounds of the formula I and optionally of the formula II is in the range from 1:1 to 10:1, particularly in the range from 1.01:1 to 5:1 and especially in the range from 1.05:1 to 1:5 or 1.1:1 to 2:1.

A formaldehyde equivalent is understood to mean a compound which releases formaldehyde under polymerization conditions. The formaldehyde equivalent is preferably an oligomer or polymer of formaldehyde, i.e. a substance with the empirical formula (CH$_2$O)$_z$ where z specifies the degree of polymerization. These include in particular trioxane (3 formaldehyde units) and paraformaldehyde (higher oligomer (CH$_2$O)$_z$).

The copolymerization is preferably effected using formaldehyde and formaldehyde equivalents selected from gaseous formaldehyde, trioxane and paraformaldehyde.

In a preferred embodiment of the process according to the invention, the compounds of the formula I and optionally of the formula II are copolymerized with the compounds selected from formaldehyde and formaldehyde equivalents in the presence of catalytic amounts of an acid. Typically, the acid is used in an amount of 0.1 to 10% by weight, especially 0.2 to 5% by weight, based on the compounds of the formula I and optionally of the formula II. Preferred acids here are Brønsted acids, for example organic carboxylic acids, for example trifluoroacetic acid, oxalic acid or lactic acid, and organic sulfonic acids such as methanesulfonic acid, trifluoromethanesulfonic acid or p-toluenesulfonic acid. Likewise suitable are inorganic Brønsted acids such as HCl, H$_2$SO$_4$ or HClO$_4$. The Lewis acid used may, for example, be BF$_3$, BCl$_3$, SnCl$_4$, TiCl$_4$ or AlCl$_3$. It is also possible to use Lewis acids in complex-bound form or dissolved in ionic liquids.

The copolymerization can also be catalyzed with bases. Examples are amines such as triethylamine or dimethylaniline, hydroxides and basic salts of alkali metals and alkaline earth metals such as LiOH, NaOH, KOH, Ca(OH)$_2$, Ba(OH)$_2$ or Na$_3$PO$_4$, and also alkoxides of alkali metals and alkaline earth metals, such as sodium methoxide, sodium ethoxide, potassium tert-butoxide or magnesium ethoxide.

The copolymerization can also be initiated thermally, which means that the copolymerization is effected without addition of an acid, by heating a mixture of the compounds of the formula I and optionally of the formula II and the compounds selected from formaldehyde and formaldehyde equivalents.

The temperatures required for the copolymerization are typically in the range from 50 to 250° C., especially in the range from 80 to 200° C. In an acid or base-catalyzed copolymerization, the polymerization temperatures are typically in the range from 50 to 200° C. and especially in the range from 80 to 150° C. In the thermally initiated copolymerization, the polymerization temperatures are typically in the range from 120 to 250° C. and especially in the range from 150 to 200° C.

The copolymerization can in principle be performed as what is called a batch or addition process. In the case of performance as a batch, the compounds of the formula I or the mixture of at least one compound of the formula I with at least one compound of the formula II and the compounds selected from formaldehyde and formaldehyde equivalents are initially charged in the desired amount in the reaction vessel and brought to the conditions required for copolymerization. In the case of the addition process, at least one of the two components, i.e. the compound(s) of the formula I and optionally of the formula II and/or the compound selected from formaldehyde and formaldehyde equivalents, is supplied at least partly in the course of the polymerization, until the desired ratio of the compound of the formula I and optionally of the formula II to the compound selected from formaldehyde and formaldehyde equivalents has been attained. The addition is optionally followed by a continued reaction phase. Preference is given to performance as a batch.

It has been found to be advantageous when the copolymerization is performed in one stage, i.e. the polymerization is performed as a batch with the total amount of the compounds of the formula I and optionally of the formula II to be polymerized and of the compounds selected from formaldehyde and formaldehyde equivalents, or an addition process is employed, in which the compounds of the formula I and optionally of the formula II and the compounds selected from formaldehyde and formaldehyde equivalents are added in such a way that the polymerization conditions are not interrupted until the total amount of the compounds of the formula I and optionally of the formula II and of the compounds selected from formaldehyde and formaldehyde equivalents has been added to the reaction vessel.

The copolymerization of the compounds of the formula I or of the mixture of at least one compound of the formula I and at least one compound of the formula II and the compounds selected from formaldehyde and formaldehyde equivalents can be performed in bulk or in an inert diluent. Suitable diluents are, for example, halogenated hydrocarbon such as dichloromethane, trichloromethane, 1,2-dichloroethene, or hydrocarbons such as toluene, xylene or hexane, and mixtures thereof.

Preference is given to performing the copolymerization of the compounds of the formula I or of the mixture of at least one compound of the formula I and at least one compound of the formula II with the compounds selected from formaldehyde and formaldehyde equivalents in the substantial absence of water, which means that the concentration of water on commencement of the polymerization is less than 0.1% by weight, based on the total amount of monomer to be polymerized.

The copolymerization of the compounds of the formula I or of the mixture of at least one compound of the formula I and at least one compound of the formula II with the compounds selected from formaldehyde and formaldehyde equivalents may be followed by purification steps and optionally drying steps.

The copolymerization of the compounds of the formula I or of the mixture of at least one compound of the formula I and at least one compound of the formula II with the compounds selected from formaldehyde and formaldehyde equivalents may be followed by a calcination. In this case, the organic polymeric material formed in the copolymerization of the compounds of the formula I or of the mixture of at least one compound of the formula I and at least one compound of the formula II with the compound selected from formaldehyde and formaldehyde equivalents is carbonized to give the carbon phase.

The copolymerization of the compounds of the formula I or of the mixture of at least one compound of the formula I and at least one compound of the formula II with the compounds selected from formaldehyde and formaldehyde equivalents may be followed by an oxidative removal of the organic polymer phase. This involves oxidizing the organic polymeric material formed in the copolymerization of the organic constituents to obtain a nanoporous oxidic or nitridic material.

The composite material obtainable by the process according to the invention has at least one oxidic phase which comprises the metal, semimetal or nonmetal M or M', and at least one organic polymer phase which results from the polymerization of the aryloxy groups ArO or Ar'O with the formaldehyde. The dimensions of the phase domains in the composite material thus obtained are usually in the region of a few nanometers, but it is possible to obtain materials with domain sizes up to 100-200 nm. In addition, the phase domains of the oxidic phase and the phase domains of the organic phase generally have a co-continuous arrangement, i.e. both the organic phase and the inorganic or organometallic phase penetrate one another and essentially do not form any discontinuous regions. The distances between adjacent phase boundaries, or the distances between the domains of adjacent identical phases, are extremely small and are on average not more than 10 nm, preferably not more than 5 nm and especially not more than 2 nm. There is no occurrence of macroscopically visible separation into discontinuous domains of the particular phase.

The mean distance between the domains of adjacent identical phases can be determined by means of combined small-angle X-ray scattering (SAXS) via the scatter vector q (measurement in transmission at 20° C., monochromatized $CuK_\alpha$ radiation, 2D detector (image plate), slit collimation).

With regard to the terms "continuous phase domain", "discontinuous phase domain" and "co-continuous phase domain", reference is also made to W. J. Work et al. Definitions of Terms Related to Polymer Blends, Composites and Multiphase Polymeric Materials, (IUPAC Recommendations 2004), Pure Appl. Chem., 76 (2004), p. 1985-2007, especially p. 2003. According to this, a co-continuous arrangement of a two-component mixture is understood to mean a phase-separated arrangement of the two phases, in which within one domain of the particular phase a continuous path through either phase domain may be drawn to all phase boundaries without crossing any phase domain boundary.

The composite materials obtainable in accordance with the invention can be converted in a manner known per se to nanoporous inorganic materials, by oxidatively removing the organic constituents of the inventive nanocomposite material. This preserves the nanostructure of the inorganic phase present in the inventive nanocomposite material, and the result, depending on the compounds of the formula I selected, is an oxide of the (semi)metal or of the nonmetal, or a mixed form. The oxidation is effected typically by heating in an oxygenous atmosphere as described in the article by Spange et al. cited at the outset. In general, heating is effected with ingress of oxygen at a temperature in the range from 400 to 1500° C., especially in the range from 500 to 1000° C. The heating is typically effected in an oxygenous atmosphere, for example in air or other oxygen/nitrogen mixtures, the proportion by volume of oxygen being variable over wide ranges and being, for example, in the range from 5 to 50% by volume, based on the overall gas mixture.

The composite materials obtainable in accordance with the invention can also be converted to an electrically active nanocomposite material which, as well as an inorganic phase of a (semi)metal, which may be either oxidic or (semi)metallic, has a carbon phase C. Such materials are obtainable by calcining the composite material obtainable in accordance with the invention with substantial or complete exclusion of oxygen. In the carbonaceous nanocomposite material, the carbon phase C and the inorganic phase form essentially co-continuous phase domains, where the mean distance between two adjacent domains of identical phases is generally not more than 10 nm. In general, the calcination is effected at a temperature in the range from 400 to 2000° C., especially in the range from 500 to 1000° C. The calcination is then typically effected with substantial exclusion of oxygen. In other words, during the calcination, the partial oxygen pressure in the reaction zone in which the calcination is performed is low, and will preferably not exceed 20 mbar, especially 10 mbar. Preference is given to performing the calcination in an inert gas atmosphere, for example under nitrogen or argon. The inert gas atmosphere will preferably comprise less than 1% by volume, especially less than 0.1% by volume, of oxygen. In a likewise preferred embodiment of the invention, the calcination is performed under reducing conditions, for example in an atmosphere which comprises hydrogen ($H_2$), hydrocarbon gases such as methane, ethane or propane, or ammonia ($NH_3$), optionally as a mixture with an inert such as nitrogen or argon. To remove volatile constituents, the calcination can be performed in an inert gas stream or in a gas stream which comprises reducing gases such as hydrogen, hydrocarbon gases or ammonia.

The composite materials obtainable in accordance with the invention find particularly advantageous use in accordance with the invention for production of gas storage materials, rubber mixtures, low-K dielectrics and electrode materials for lithium ion batteries.

The example which follows serves to illustrate the invention.

Compounds of the Formula I Used:

Diphenoxysilane (compound of the formula I where M=Si, m=2, n=0, r=0, p=2, q=1, Ar=phenyl). The preparation was effected by the method described by G. Fester (Thesis, 2009, Bergakademie Freiberg/Sa, Example 20f.).

Diphenoxymethylsilane (compound of the formula I where M=Si, m=2, n=0, r=1, p=1, q=1, Ar=phenyl, R=$CH_3$). The preparation was effected by the method described in DE 1162365, Example 3.

EXAMPLE 1

Precipitation Polymerization of Diphenoxymethylsilane and Tetraphenoxysilane in Solution In a 250-ml four-neck flask, 15 g of diphenoxymethylsilane and 5 g of tetraphenoxysilane were melted with 7.8 g of trioxane under nitrogen at 40-50° C. and diluted with 80 g of xylene. To this was added 0.2 g of methanesulfonic acid at 50° C. and the mixture was homogenized. Subsequently, the mixture was stirred at a stirrer speed of 500-600 rpm at 80° C. for 30 min, at 100° C. for 30 min and at 120° C. for 30 min. The mixture was cooled to room temperature, filtered through a D4 frit, washed with xylene and hexane, and dried with a vacuum drying cabinet. This gave 25 g of a fine powder. The primary particles exhibited the domain structures typical of a twin polymerization, with dimensions in the range of 2-5 nm (determined by means of TEM).

EXAMPLE 2

Precipitation Polymerization of Diphenoxymethylsilane and Tetraphenoxysilane in Solution In a 250-mL-Erlenmeyer flask, 50 g of diphenoxymethylsilane and 14.3 g of trioxane were melted under nitrogen at 70° C. To this was added a solution of 49.4 g stannous dichloride in 120 ml of tetrahydrofurane and cooled to 22° C. by means of an ice bath. The solution was transferred in a dropping funnel. 250 ml of xylene and 2.5 g of methanesulfonic acid were charged into a 250-ml four-neck flask and heated to 126° C. with an oil bath. To this was added the solution of diphenoxymethylsilane, and stannous dichloride in THF within 105 min and kept the temperature of the mixture at 120-125° C. THF and water were distilled off via a a water trap. The reaction mixture was stirred for further 60 min at 136 internal temperature. The crude product was filtered off by means of a suction filter and washed twice with 100 ml of toluene and twice with 100 ml of hexanes. The crude product was dried at 90° C. and 5 mbar. Thereby 47.7 g crude product was obtained. The crude product was treated with 5 g of sodium methylate and 1 l of water and stirred for two h at 22° C. Then the product was filtered off, washed twice with 100 ml of methanol and dried at 80° C. and 5 mbar. Thereby a composite material was obtained which contained 4.3% of silicon, as determined by elementary analysis.

The primary particles exhibited the domain structures typical of a twin polymerization, with dimensions in the range of 3-5 nm (determined by means of TEM).

The invention claimed is:

1. A process for producing a composite material composed of
   a) at least one oxidic phase and
   b) an organic polymer phase,
   comprising the copolymerization of at least one compound of the general formula I $$[(ArO)_m MO_n R_r H_p]_q \qquad (I)$$

in which
M is B, Al, Ga, In, Si, Ge, Sn, P, As or Sb,
m is 1, 2 or 3,
n is 0 or 1,
r is 0, 1 or 2,
p is 1, 2 or 3,
q is 1 or an integer >1, for example an integer from 2 to 20, especially an integer from 3 to 6,
m+2n+r+p is 1, 2, 3, 4 or 5 and corresponds to the valency of M,
Ar is phenyl or naphthyl, where the phenyl ring or the naphthyl ring is unsubstituted or may have one or more, substituents selected independently from alkyl, cycloalkyl, alkoxy, cycloalkoxy and $NR^a R^b$ in which $R^a$ and $R^b$ are each independently hydrogen, alkyl or cycloalkyl,
R is alkyl, alkenyl, cycloalkyl or aryl, where aryl is unsubstituted or may have one or more substituents selected independently from alkyl, cycloalkyl, alkoxy, cycloalkoxy and $NR^a R^b$ in which $R^a$ and $R^b$ are each as defined above,
with at least one compound selected from formaldehyde and formaldehyde equivalents in a reaction medium which is essentially anhydrous.

2. The process according to claim 1, wherein the compound selected from formaldehyde and formaldehyde equivalents is used in such an amount that the molar ratio of formaldehyde to the aryloxy groups ArO in the compound of the formula I is at least 0.9:1.

3. The process according to claim 1, wherein M is B, Si, Sn or P, m is 1, 2 or 3, n is 0 or 1, r is 0 or 1 and p is 1 or 2.

4. The process according to claim 1, wherein the variable M is Si.

5. The process according to claim 1, wherein the compound of the formula I is diphenoxymethylsilane, triphenoxysilane or diphenoxysilane.

6. The process according to claim 1, wherein the compound of the formula I is used in a mixture with at least one of the compounds of the formula II:

$$[(Ar'O)_a M'O_c R'_b]_d \qquad (II)$$

in which

M' is a metal, a semimetal, or a nonmetal other than carbon and nitrogen which forms oxo acids;

a is 1, 2, 3, 4, 5 or 6, b is 0, 1 or 2, c is 0, 1 or 2, d is 1 or an integer >1, a+b+2c is 1, 2, 3, 4, 5 or 6 and corresponds to the valency of M', Ar' is phenyl or naphthyl, where the phenyl ring or the naphthyl ring is unsubstituted or may have one or more substituents selected independently from the group consisting of alkyl, cycloalkyl, alkoxy, cycloalkoxy and $NR^a R^b$ in which $R^a$ and $R^b$ are each independently hydrogen, alkyl or cycloalkyl;

R' is alkyl, alkenyl, cycloalkyl or aryl, where aryl is unsubstituted or may have one or more substituents selected independently from alkyl, cycloalkyl, alkoxy, cycloalkoxy and $NR^a R^b$ in which $R^a$ and $R^b$ are each as defined above.

7. The process according to claim 1, wherein the compound selected from formaldehyde and formaldehyde equivalents is used in such an amount that the molar ratio of formaldehyde to the aryloxy groups ArO or Ar'O in the compounds of the formula I and optionally of the formula II is in the range from 1:1 to 10:1.

8. The process according to claim 1, wherein the compound selected from formaldehyde and formaldehyde equivalents is paraformaldehyde, trioxane or gaseous formaldehyde.

9. The process according to claim 1, wherein the copolymerization is performed in the presence of an acid.

10. The process according to claim 9, wherein the acid is used in an amount of 0.1 to 10% by weight, based on the compound of the formula I or on the mixture of the compounds of the formulae I and II.

11. The process according to claim 1, wherein the copolymerization is performed in one stage.

12. The process according to claim 1, wherein the copolymerization is performed in an inert solvent.

13. The process according to claim 1, wherein the copolymerization is performed in bulk.

14. The process according to claim 1, wherein a calcination is performed after the copolymerization.

* * * * *